United States Patent [19]
Murray

[11] Patent Number: 5,652,298
[45] Date of Patent: Jul. 29, 1997

[54] WATER-BASED ADHESIVE

[75] Inventor: Robert Murray, Kent, Ohio

[73] Assignee: Akron Paint & Varnish, Akron, Ohio

[21] Appl. No.: 685,767

[22] Filed: Jul. 24, 1996

Related U.S. Application Data

[60] Continuation of Ser. No. 470,915, Jun. 6, 1995, abandoned, which is a division of Ser. No. 305,067, Sep. 13, 1994, which is a continuation-in-part of Ser. No. 180,679, Jan. 13, 1994, Pat. No. 5,395,879.

[51] Int. Cl.$^6$ .................................................. C08L 7/02
[52] U.S. Cl. ........................... 524/571; 524/72; 524/270; 524/274; 524/377; 524/495; 524/496; 524/575; 524/575.5
[58] Field of Search ........................ 524/72, 270, 274, 524/377, 495, 496, 571, 575, 575.5

[56] References Cited

U.S. PATENT DOCUMENTS

| | | |
|---|---|---|
| 3,843,484 | 10/1974 | Kamiyoshi . |
| 3,857,730 | 12/1974 | Kalafus et al. . |
| 3,947,394 | 3/1976 | Kalafus et al. . |
| 4,026,744 | 5/1977 | Elmer . |
| 4,285,756 | 8/1981 | Elmer . |
| 4,440,881 | 4/1984 | Girgis . |
| 4,463,120 | 7/1984 | Collins et al. . |
| 4,772,499 | 9/1988 | Greenway ................. 428/43 |
| 5,395,879 | 3/1995 | Murray ..................... 524/571 |

*Primary Examiner*—Edward J. Cain

[57] ABSTRACT

The present invention provides an organic solvent-free composition useful as an adhesive for bonding natural rubber compounds, synthetic rubber compounds and a combination of natural and synthetic rubber compounds.

7 Claims, No Drawings

WATER-BASED ADHESIVE

This application is a continuation of application Ser. No. 08/470,915, filed Jun. 6, 1995, now abandoned, which is a division of 08/305,017 filed Sep. 13, 1994, allowed which is a continuation-in-part application of application Ser. No. 08/180,679, now U.S. Pat. No. 5,395,879.

The present invention relates to adhesive compositions, particularly to aqueous adhesive compositions which may be used for bonding natural rubber compounds, synthetic rubber compounds and a combination of natural and synthetic rubber compounds.

BACKGROUND OF THE INVENTION

Solvent containing adhesives are most commonly used in tire manufacture because they are easy to work, especially at low temperature, and generally provide a good quick bonding capacity and good adhesive strengths. A serious disadvantage of solvent containing adhesives is the large quantity of organic solvents they contain. The latter are released by evaporation during working and thus result in a considerable odor nuisance which, in some circumstances, may even lead to a health risk for the person working with said adhesive. An additional point to note when working with these adhesives is that, owing to the evaporation, explosive solvent/air mixtures may be produced. In view of the hazards associated with the use of organic solvents, it would be desirable to eliminate the amount of organic solvent present in adhesive compositions which are used for bonding.

Aqueous compositions have been used prior to the present invention for bonding polyester tire cords to rubber compounds. For example, U.S. Pat. No. 2,482,931 to Perkerson provides a method of bonding rubber to cotton and rayon fabrics for the production of tire carcasses by employing an adhesive comprising a rubber latex and a small amount of a water-soluble salt of polyacrylic or polymethacrylic acid. There is no disclosure of bonding tread stock to a tire carcass.

U.S. Pat. No. 3,843,484 to Kamiyoshi et al describes a method for bonding a synthetic fibrous material to rubber by applying an aqueous dispersion containing a novolac resin which is derived from the reaction of a monohydroxy benzene and formaldehyde, a precondensate derived from the reaction of resorcinol and formaldehyde and a rubber latex.

U.S. Pat. No. 3,857,730 to Kalafus et al. describes a process for bonding rubber compounds to polyester reinforcing elements by employing a one-step dip process in which the dip consists essentially of an alkaline aqueous emulsion of a rubbery vinyl pyridine copolymer containing butadiene-styrene and 2-vinyl pyridine and a heat reactable 2,6-bis(2,4-dihydroxy phenylmethyl)4-chlorophenol composition.

U.S. Pat. No. 3,947,394 to Kalafus et al. provides a process for bonding rubber compounds to polyester reinforcing elements, particularly tire cords of polyester fibers, using a one-step dip process in which the dip consists essentially of an alkaline aqueous emulsion of a minor amount by weight of a mixture of a major amount by weight of a rubbery vinyl pyridine copolymer and a minor amount by weight of a heat reactable 2,6-bis(2,4-dihydroxy phenylmethyl)4-chlorophenol composition, wherein said emulsion is essentially free of alkali metal materials and wherein the emulsifier used in the emulsion is an ammonium salt or soap. High aged H-adhesions are obtained with this process.

U.S. Pat. No. 4,026,744 to Elmer also discloses a method for bonding rubber compounds to reinforcing elements by using a dip process in which the dip contains an alkaline aqueous dispersion of a mixture of a rubbery vinyl pyridine/styrene/butadiene terpolymer and a lignin sulfonate-resorcinol-formaldehyde reaction product.

U.S. Pat. No. 4,285,756 to Elmer describes an aqueous alkaline dispersion containing a rubbery polybutadiene and a water-soluble heat reactive phenolic resin which is useful as an adhesive for bonding polyamide or polyester reinforcing elements to ethylene-propylene-diene rubbery polymer compounds.

U.S. Pat. No. 4,440,881 to Girgis provides an aqueous coating composition for filamentary materials, which composition yields coated filamentary material with improved weavability and that yields reinforced elastomeric materials having improved properties of flexibility and fatigue resistance. The aqueous adhesive coating composition has a vinyl-pyridine-containing copolymer or terpolymer latex, a non-selfcrosslinkable elastomeric latex, a carboxylated butadiene polymer, and a phenolic aldehyde condensate polymer. The vinyl pyridine-containing elastomeric latex is produced from a vinyl pyridine-containing monomer, 1,3-diene hydrocarbon monomer or the terpolymer is produced in the same way with the addition of a vinyl containing monomer. The non-selfcrosslinkable elastomeric latex has a low gel content of less than around 40 weight percent and a low average particle size of less than around 2000 angstroms. The carboxylated butadiene polymer or butadiene styrene copolymer has less than 75 percent bound styrene and about 1 to 10 weight percent carboxylation, where both values are based on the weight of the carboxylated polymer or copolymer. The amount of the carboxylated butadiene polymer or butadiene styrene copolymer in the coating is in the range of 3 to about 10 weight percent on the basis of a dried coating. In addition, the aqueous adhesive coating composition may contain a wax emulsion, and antioxidant. The aqueous adhesive coating composition is used to treat filamentary material, which are then dried or dried and partially cured, and combined with the elastomeric matrix material to produce reinforced elastomeric products.

U.S. Pat. No. 4,463,120 ("the '120 patent") discloses a process for preparing an aqueous adhesive composition which comprises preparing a solvent dispersion by mixing rubber, carbon black, vulcanizing agent, tackifying resin and accelerator with sufficient organic solvent to form a solvent dispersion and thereafter emulsifying the solvent dispersion in the presence of water to form an aqueous emulsion. The aqueous emulsion may be used to bond unvulcanized rubber compounds, such as a tread stock to the carcass portion during the formation of a tire. While the '120 patent utilizes organic solvents, the present invention achieves better adhesion without the use of the environmentally deleterious organic solvents.

U.S. Pat. No. 4,497,927 ("the '927 patent") discloses a tire tread adhesive or cement having superior green tack, excellent cured adhesion, and rapid drying time is disclosed. The tread cement comprises a water-in-oil emulsion having an oil continuous phase in which is dissolved a vulcanizable rubber compound. The water-in-oil emulsion tread adhesive may contain from 20–80% water, thereby minimizing environmental contamination on drying. Again, while the amount of organic solvent is minimized, organic solvents continue to be present in the compositions of the '927 patent.

U.S. Pat. No. 4,623,414 ("the '414 patent") discloses a process for preparing an aqueous adhesive composition which comprises preparing a solvent dispersion by mixing rubber, carbon black, vulcanizing agent, tackifying resin and accelerator with sufficient organic solvent to form a solvent dispersion and thereafter emulsifying the solvent dispersion in the presence of water to form an aqueous emulsion. The aqueous emulsion may be used to bond unvulcanized rubber compounds, such as a tread stock to the carcass portion during the formation of a tire. The '414 patent is a based on a divisional application from the '120 patent and thus comprises the same drawbacks as the '120 patent.

The parent application, Ser. No. 08/180,679, of this continuation-in-part application, discloses an adhesive composition having no organic solvents. The parent application discloses an adhesive composition that comprises an elastomer, water, pH adjusters, surfactant/stabilizer, carbon black, zinc oxide, sulfur, and accelerator. In addition to these essential elements of the composition, the parent application also discloses viscosity adjusters and resin emulsion as optional elements of the composition.

Although the adhesive composition disclosed in the parent application has been found to be very successful in retreading tires—over 250,000 truck tires have been retreaded and not one has failed due to the quality of the adhesive composition—there is a need to reduce the number of essential elements of the composition, especially carbon black, zinc oxide, sulfur, and accelerator. That is, while it is imperative that the superior quality of the water based adhesive disclosed in the parent application be maintained, there is a need to reduce the number of essential elements of the composition. This present invention has made this possible, while simultaneously improving the cured adhesion for applications other than tire retreading.

Thus, there is a need (1) for a composition that is completely devoid of organic solvents, (2) for a composition that demonstrates superior adhesive properties, and (3) for a composition that requires less essential ingredients than application Ser. No. 08/180,679.

SUMMARY OF THE INVENTION

It is a primary object of the present invention to provide a composition that is devoid of organic solvents.

It is another object of the present invention to provide a composition that demonstrates superior adhesive properties.

It still another object of the present invention to provide a composition which is free of carbon black, zinc oxide, sulfur, and/or accelerator, thereby being easier, faster, and less expensive to make.

Additional objects, advantages, and other novel features of the invention will be set forth in part in the description that follows and, in part, will become apparent to those skilled in the art upon examination of the following or may be learned with the practice of the invention.

In accordance with one aspect of the present invention, there is provided a composition useful as an adhesive and comprising by weight percent based on total weight of said composition: about 25.0 to 50.0% of an elastomer selected from the group consisting of natural rubber, styrene butadiene rubber, polybutadiene rubber, polychloroprene rubber, nitrile rubber, polyurethane rubber, butyl rubber and mixtures thereof; about 40.0 to 60.0% water; about 0.02 to 0.60% pH adjusters selected from the from the group consisting of potassium hydroxide, aqueous ammonia and mixtures thereof; and about 0.10 to 1.8% surfactant/stabilizer selected from the group consisting of sodium lignosulfate, octylphenoxypolyethoxyethanol, polyoxyethylene sorbitrol fatty acid ester, sulfated fatty acid and mixtures thereof.

In accordance with another aspect of the present invention, there is provided an article of manufacture, having applied thereupon a composition comprising by weight percent based on total weight of said composition: about 25.0 to 50.0% of an elastomer selected from the group consisting of natural rubber, styrene butadiene rubber, polybutadiene rubber, polychloroprene rubber, nitrile rubber, polyurethane rubber, butyl rubber and mixtures thereof; about 40.0 to 60.0 % water; about 0.02 to 0.60% pH adjusters selected from the from the group consisting of potassium hydroxide, aqueous ammonia and mixtures thereof; and about 0.10 to 1.8% surfactant/stabilizer selected from the group consisting of sodium lignosulfate, octylphenoxypolyethoxyethanol, polyoxyethylene sorbitrol fatty acid ester, sulfated fatty acid and mixtures thereof.

DETAILED DESCRIPTION OF THE INVENTION

The invention will now be described as embodied in several preferred embodiments.

Elastomers selected from the group consisting of natural rubber, styrene butadiene rubber, polybutadiene rubber, polychloroprene rubber, nitrile rubber, polyurethane rubber, butyl rubber and mixtures thereof, may be employed in the composition of the present invention. About 25.0 to 50.0% of elastomer by total weight of the composition is required for optimal adhesive properties.

The compositions of the present invention further comprise about 0.02 to 0.60 weight percent pH adjusters selected from the group consisting of potassium hydroxide, aqueous ammonia and mixtures thereof.

The compositions of the present invention also comprise about 0.10 to 1.8% surfactant/stabilizer selected from the group consisting of sodium lignosulfate, octylphenoxypolyethoxyethanol, polyoxyethylene sorbitrol fatty acid ester, sulfated fatty acid and mixtures thereof.

The compositions of the present invention are manufactured by mixing pH adjusters water with the elastomer emulsion, using mild agitation. The total water content is about 40 to 60 weight percent (by total weight of the composition).

Optionally, the compositions of the present invention may include up to about 10.0% carbon black selected from the group consisting of N-300 and N-200 series (designations used in the adhesive industry for carbon blacks) and mixtures thereof.

The compositions of the present invention may also optionally include up to about 0.75% zinc oxide.

The compositions of the present invention may also optionally include up to about 0.40% sulfur.

The compositions of the present invention may also optionally include up to about 0.20% accelerator selected from the group consisting of dibenzothiazyl disulfide, tetraethyl thiuram disulfide, tetramethyl thiuram disulfide, tetramethyl thiuram monosulfide, n-tert-butyl-2-benzothiazolesulfenamide, diphenyl guanidine and mixtures thereof, is a critical component of the compositions of the present invention.

The compositions of the present invention may also optionally include up to about 0.50% viscosity adjusters selected from the group consisting of hydroxyethyl cellulose, hydroxypropyl methylcellulose and mixtures thereof.

Lastly, the compositions of the present invention may also include up to about 23% resin emulsion selected from the group consisting of alkylphenol novolac, hydrogenated rosin and mixtures thereof.

Although the resulting aqueous adhesive may be used in tire applications, it is recommended that the aqueous adhesive made without carbon black be not used for tire applications. However, the aqueous adhesive made using carbon black may be advantageously applied to the bottom of an extruded tire tread and or to a carcass portion by spraying, dipping, brushing or flooding. After drying the adhesive, the tread is contacted with the carcass. The dried adhesive forms a thin layer between the tread and carcass portion of the tire. Further operations in the manufacture of the tire may be carried out in the usual manner.

The adhesive compositions of the present invention may also be used to bond tire tread ends to each other. However, in using the adhesives of the present invention in tire retreading, it has been found that both the surfaces to be bonded to each other have to be coated with the adhesive. It has also been determined that the adhesives of the present invention are capable of being used with a greater variety of rubbers than what is possible with the adhesives of parent application Ser. No. 08/180,679. Polyester fibers, yarns, filaments, cords or fabric may be bonded to vulcanizable rubber compounds by means of the compositions of the present invention, in order to prepare radial, bias or belted-bias passenger tires, truck tires including the carcasses, belts, motorcycle and bicycle tires, off-the-road tires, transmission belts, V-belts, conveyor belts, hose, gaskets, rubbers tarpaulins and the like.

The invention will now be described as embodied in the following example compositions, wherein all percentages are by weight of the entire composition:

|  | #1 | #2 | #3 | #4 | #5 |
| --- | --- | --- | --- | --- | --- |
| Water | 44.53 | 54.67 | 46.39 | 54.59 | 48.95 |
| Natural Rubber | 36.23 | 41.77 | 29.50 | 43.87 | 39.91 |
| Carbon Black | 0.51 | 2.69 | 6.81 | — | 0.56 |
| Zinc Oxide | 0.03 | — | — | 0.55 | 0.03 |
| Sulfur | 0.02 | — | — | 0.37 | 0.02 |
| MBTS Accelerator | 0.01 | — | — | 0.20 | 0.01 |
| Resin Emulsion | 18.41 | — | 15.55 | — | 10.13 |
| Aqueous Ammonia | 0.02 | 0.10 | 0.26 | 0.04 | 0.02 |
| Potassium Hydroxide | 0.03 | 0.02 | 0.02 | 0.04 | 0.02 |
| Hydroxyethyl Cellulose | 0.10 | 0.24 | 0.17 | 0.13 | 0.23 |
| Sodium Lignosulfate | 0.11 | 0.51 | 1.30 | 0.21 | 0.12 |
|  | 100.0 | 100.0 | 100.0 | 100.0 | 100.0 |
| Strip Adhesion (ppi)* | 94.0 | 96.0 | 120.0 | 92.0 | 91.0 |

*ppi = pounds per inch (all showed rubber tear)

It has been discovered that carbon black is always required in tire retreading applications, as part of the solvent-free adhesive. Carbon black may be dispensed with in non-tire applications, but in such a non-tire application, an accelerator is always required. The accelerator speeds the adhesion of uncured rubber on cured rubber by curing the uncured rubber.

Thus it is apparent that there has been provided, in accordance with the invention, a composition useful as an adhesive for use with natural and synthetic rubbers, which composition fully satisfies the aspects and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations which fall within the spirit and broad scope of the appended claims.

I claim:

1. A composition having no organic solvents contained therein, said composition useful as an adhesive and comprising by weight percent based on total weight of said composition:

about 25.0 to 50.0% of an elastomer selected from the group consisting of natural rubber, styrene butadiene rubber, polybutadiene rubber, polychloroprene rubber, nitrile rubber, polyurethane rubber, butyl rubber and mixtures thereof; about 40.0 to 60.0% water;

about 0.02 to 0.60% pH adjusters selected from the group consisting of potassium hydroxide, aqueous ammonia and mixtures thereof;

about 0.10 to 1.8% surfactant/stabilizer selected from the group consisting of sodium lignosulfate, octylphenoxypolyethoxyethanol, polyoxyethylene sorbitol fatty acid ester, sulfated fatty acid and mixtures thereof; and from about 0.51 to 10.0% carbon black selected from the group consisting of N-300 and N-200 series and mixtures thereof.

2. An article of manufacture, having applied thereupon a composition comprising by weight percent based on total weight of said composition:

about 25.0 to 50.0% of an elastomer selected from the group consisting of natural rubber, styrene butadiene rubber, polybutadiene rubber, polychloroprene rubber, nitrile rubber, polyurethane rubber, butyl rubber and mixtures thereof;

about 40.0 to 60.0% water;

about 0.02 to 0.60% pH adjusters selected from the from the group consisting of potassium hydroxide, aqueous ammonia and mixtures thereof;

about 0.10 to 1.8% surfactant/stabilizer selected from the group consisting of sodium lignosulfate, octylphenoxypolyethoxyethanol, polyoxyethylene sorbitol fatty acid ester, sulfated fatty acid and mixtures thereof; and from about 0.51 to 10.0% carbon black selected from the group consisting of N-300 and N-200 series and mixtures thereof.

3. The article of manufacture of claim 2 being a rubber article made of natural or synthetic rubber or a mixture of natural and synthetic rubber.

4. The article of manufacture of claim 3, wherein said composition further comprises up to about 0.50% viscosity adjusters selected from the group consisting of hydroxyethyl cellulose, hydroxypropyl methylcellulose and mixtures thereof.

5. The article of manufacture of claim 3, wherein said composition further comprises up to about 23.0% resin emulsion selected from the group consisting of alkylphenol novolac, hydrogenated rosin, modified rosin ester and mixtures thereof.

6. The composition of claim 1, wherein said composition further comprises from about 0.03 to 0.75% zinc oxide; from about 0.02 to 0.40% sulfur; and from about 0.01 to 0.20% accelerator selected from the group consisting of dibenzothiazyl disulfide, tetraethyl thiuram disulfide, tetramethyl thiuram disulfide, tetramethyl thiuram monosulfide, n-tert-butyl-2-benzothiazolesulfenamide, diphenyl guanidine and mixtures thereof.

7. The article of manufacture of claim 2, wherein said composition further comprises from about 0.03 to 0.75% zinc oxide; from about 0.02 to 0.40% sulfur; and from about 0.01 to 0.20% accelerator selected from the group consisting of dibenzothiazyl disulfide, tetraethyl thiuram disulfide, tetramethyl thiuram disulfide, tetramethyl thiuram monosulfide, n-tert-butyl-2-benzothiazolesulfenamide, diphenyl guanidine and mixtures thereof.

* * * * *